US009674756B2

(12) United States Patent
Pandit

(10) Patent No.: US 9,674,756 B2
(45) Date of Patent: Jun. 6, 2017

(54) EXPEDITED HANDOVER BETWEEN WIRELESS CARRIERS

(71) Applicant: Harman International Industries, Incorporated, Stamford, CT (US)

(72) Inventor: Sourabh Shyam Pandit, Pune (IN)

(73) Assignee: Harman International Industries, Incorporated, Stamford, CT (US)

( * ) Notice: Subject to any disclaimer, the term of this patent is extended or adjusted under 35 U.S.C. 154(b) by 138 days.

(21) Appl. No.: 14/677,856

(22) Filed: Apr. 2, 2015

(65) Prior Publication Data
US 2016/0295487 A1   Oct. 6, 2016

(51) Int. Cl.
*G01R 31/08* (2006.01)
*H04W 36/30* (2009.01)
*H04W 4/00* (2009.01)
*H04W 48/18* (2009.01)
*H04W 4/04* (2009.01)
*H04W 84/12* (2009.01)
*H04W 36/14* (2009.01)

(52) U.S. Cl.
CPC .......... *H04W 36/30* (2013.01); *H04W 4/008* (2013.01); *H04W 48/18* (2013.01); *H04W 4/046* (2013.01); *H04W 36/14* (2013.01); *H04W 84/12* (2013.01)

(58) Field of Classification Search
CPC ..... H04W 36/30; H04W 4/008; H04W 48/18; H04W 84/12; H04W 4/046
See application file for complete search history.

(56) References Cited

U.S. PATENT DOCUMENTS

| 8,626,165 | B1 * | 1/2014 | Narasimhan | .......... H04W 36/14 370/252 |
| 8,644,833 | B1 * | 2/2014 | Manning | ........... H04W 36/0011 455/436 |
| 9,084,179 | B2 * | 7/2015 | Visuri | .................... H04W 48/16 |
| 9,265,080 | B1 * | 2/2016 | Palin | ................... H04W 76/023 |
| 9,374,751 | B1 * | 6/2016 | Mauer | ................... H04W 36/14 |
| 9,398,531 | B1 * | 7/2016 | Zhang | ............... H04W 52/0209 |

(Continued)

OTHER PUBLICATIONS

European Patent Office, Extended European Search Report Issued in Application No. 16155192.4, Jul. 19, 2016, Germany, 9 pages.

(Continued)

*Primary Examiner* — Robert Wilson
(74) *Attorney, Agent, or Firm* — McCoy Russell LLP

(57) ABSTRACT

Embodiments are disclosed for handover between wireless carriers in multiple devices. In an example configuration, an in-vehicle computing system of a vehicle includes a first network interface configured to communicate over a first wireless carrier, a second network interface configured to communicate over a second wireless carrier, a processor configured to control communication via the first network and the second network, and a storage device storing instructions executable by the processor to connect to a computing device over the first wireless carrier. The instructions are further executable to send a select message to the computing device via a remote server, the select message identifying the second wireless carrier, receive a confirmation message from the computing device initiating communication over the second wireless carrier, and receive data from the computing device over the second wireless carrier.

20 Claims, 10 Drawing Sheets

(56) References Cited

U.S. PATENT DOCUMENTS

| | | | | | |
|---|---|---|---|---|---|
| 2007/0073929 | A1* | 3/2007 | Takayama | ............. | H04W 36/14 710/51 |
| 2009/0170495 | A1* | 7/2009 | Blum | ...................... | H04L 45/24 455/419 |
| 2009/0221283 | A1* | 9/2009 | Soliman | ................ | H04W 48/14 455/426.1 |
| 2010/0056109 | A1* | 3/2010 | Wilson | ................ | H04L 12/1827 455/412.1 |
| 2012/0250782 | A1* | 10/2012 | Chen | ..................... | H04W 40/02 375/295 |
| 2012/0295541 | A1 | 11/2012 | Kwon et al. | | |
| 2013/0217329 | A1* | 8/2013 | Reddy Badvel | ........ | G06Q 10/00 455/41.1 |
| 2013/0287012 | A1 | 10/2013 | Pragada et al. | | |
| 2013/0344804 | A1* | 12/2013 | Chen | ........................ | H04B 5/02 455/41.1 |
| 2014/0195654 | A1* | 7/2014 | Kiukkonen | ............. | H04W 8/00 709/220 |
| 2014/0219453 | A1* | 8/2014 | Neafsey | ............... | H04B 5/0056 380/270 |
| 2014/0227972 | A1* | 8/2014 | Swaminathan | ...... | H04B 5/0031 455/41.1 |
| 2015/0284231 | A1* | 10/2015 | Grant | .................... | B66F 17/006 182/19 |
| 2015/0365134 | A1* | 12/2015 | Haikonen | .............. | G06Q 10/02 455/41.2 |
| 2015/0365884 | A1* | 12/2015 | Ljung | ................... | H04W 48/16 455/436 |
| 2016/0157078 | A1* | 6/2016 | Palin | ..................... | H04W 8/005 455/41.2 |
| 2016/0233926 | A1* | 8/2016 | Asakura | ................ | H04W 4/008 |
| 2016/0295487 | A1* | 10/2016 | Pandit | ................... | H04W 4/008 |

OTHER PUBLICATIONS

NFC Forum, NFC Data Exchange Format (NDEF), NDEF 1.0, Technical Specification, Jul. 24, 2006, 25 pages.

NFC Forum, Connection Handover, Connection Handover 1.2, Technical Specification, Jul. 7, 2010, 27 pages.

IEEE Standards Association, IEEE Standard for Local and metropolitan area networks—Timing and Synchronization for Time-Sensitive Applications in Bridged Local Area Networks, Mar. 30, 2011, 292 pages.

IEEE Standards Association, IEEE Standard for Layer 2 Transport Protocol for Time-Sensitive Applications in Bridged Local Area Networks, May 6, 2011, 57 pages.

IEEE Standards Association, IEEE Standard for Local and metropolitan area networks—Media Access Control (MAC) Bridges and Virtual Bridge Local Area Networks, Aug. 31, 2011, 1,365 pages (submitted in two parts).

NFC Forum, Simple NDEF Exchange Protocol, Version 1.0, Technical Specification, Aug. 23, 2013, 20 pages.

* cited by examiner

EXPEDITED HANDOVER BETWEEN WIRELESS CARRIERS

FIELD

The disclosure relates to techniques for performing handover between different wireless carriers.

BACKGROUND

Computing devices may communicate with one another over different wireless carriers. Some wireless carriers may be suited for different communication environments or conditions than other wireless carriers. For example, some wireless carriers support fast communication (e.g., high bit rates), while other wireless carriers provide increased security or reduced pairing complexity (e.g., due to proximity ranges of the transmitters) relative to other carriers. Devices may switch between different carriers using an associated handover technique.

SUMMARY

Embodiments are disclosed for handover between wireless carriers in multiple devices. In an example configuration, an in-vehicle computing system of a vehicle includes a first network interface configured to communicate over a first wireless carrier, a second network interface configured to communicate over a second wireless carrier, a processor configured to control communication via the first network and the second network, and a storage device storing instructions executable by the processor to connect to a computing device over the first wireless carrier. The instructions are further executable to send a select message to the computing device via a remote server, the select message identifying the second wireless carrier, receive a confirmation message from the computing device initiating communication over the second wireless carrier, and receive data from the computing device over the second wireless carrier.

An example method of performing handover between wireless carriers may be performed at a first device. The example method may include establishing communication with a second device over the first wireless carrier, determining an antenna strength of a radio antenna of the second device, responsive to determining that the antenna strength is above a threshold, reading an emulated tag including an indication of the second wireless carrier identifying the second wireless carrier, and responsive to determining that the antenna strength is below a threshold, sending a select message to a SNEP server identifying the second wireless carrier. The example method further includes receiving a confirmation message from the second device initiating communication over the second wireless carrier, and receiving data from the second device over the second wireless carrier.

Another example in-vehicle computing system for performing handover between wireless carriers includes an NFC interface configured to communicate over an NFC carrier, a second network interface configured to communicate over a second wireless carrier, different from the NFC carrier, a processor configured to control communication via the NFC carrier and the second wireless carrier, and a storage device storing instructions executable by the processor to connect to a mobile computing device over NFC, and selectively perform an expedited handover based on device capabilities of the mobile computing device, wherein the expedited handover includes sending a Handover Select NDEF message to the mobile computing device via a SNEP server, the Handover Select NDEF message identifying the second wireless carrier, and logging an identifier of the SNEP server responsive to sending the Handover Select NDEF message. The instructions are further executable to receive a confirmation message from the mobile computing device initiating communication over the second wireless carrier, and receive data from the mobile computing device over the second wireless carrier.

BRIEF DESCRIPTION OF THE DRAWINGS

The disclosure may be better understood from reading the following description of non-limiting embodiments, with reference to the attached drawings, wherein below.

DETAILED DESCRIPTION

As described above, devices enabled for wireless communication may switch between different wireless carriers dynamically using handover techniques. One example of carrier handover is from Near Field Communication (NFC) to a wireless carrier that does not rely on such short range communication and provides higher bit rates (e.g., BLUETOOTH, WI-FI, etc.). An example handover routine may be performed when establishing communication between an in-vehicle computing system of a vehicle and a mobile device within that vehicle. In such a communication system, the in-vehicle computing system and mobile device may initially establish communication via NFC, then use the NFC connection to negotiate a different wireless carrier over which communication may be continued. NFC handover techniques include static and negotiated handover (as will be described in more detail below with respect to FIGS. 4 and 6, respectively), however such handover techniques may be incompatible with the mobile device. Accordingly, the disclosure provides an expedited handover that allows mobile devices with compatibility issues to still perform handover from NFC to another wireless carrier.

Figure 1:
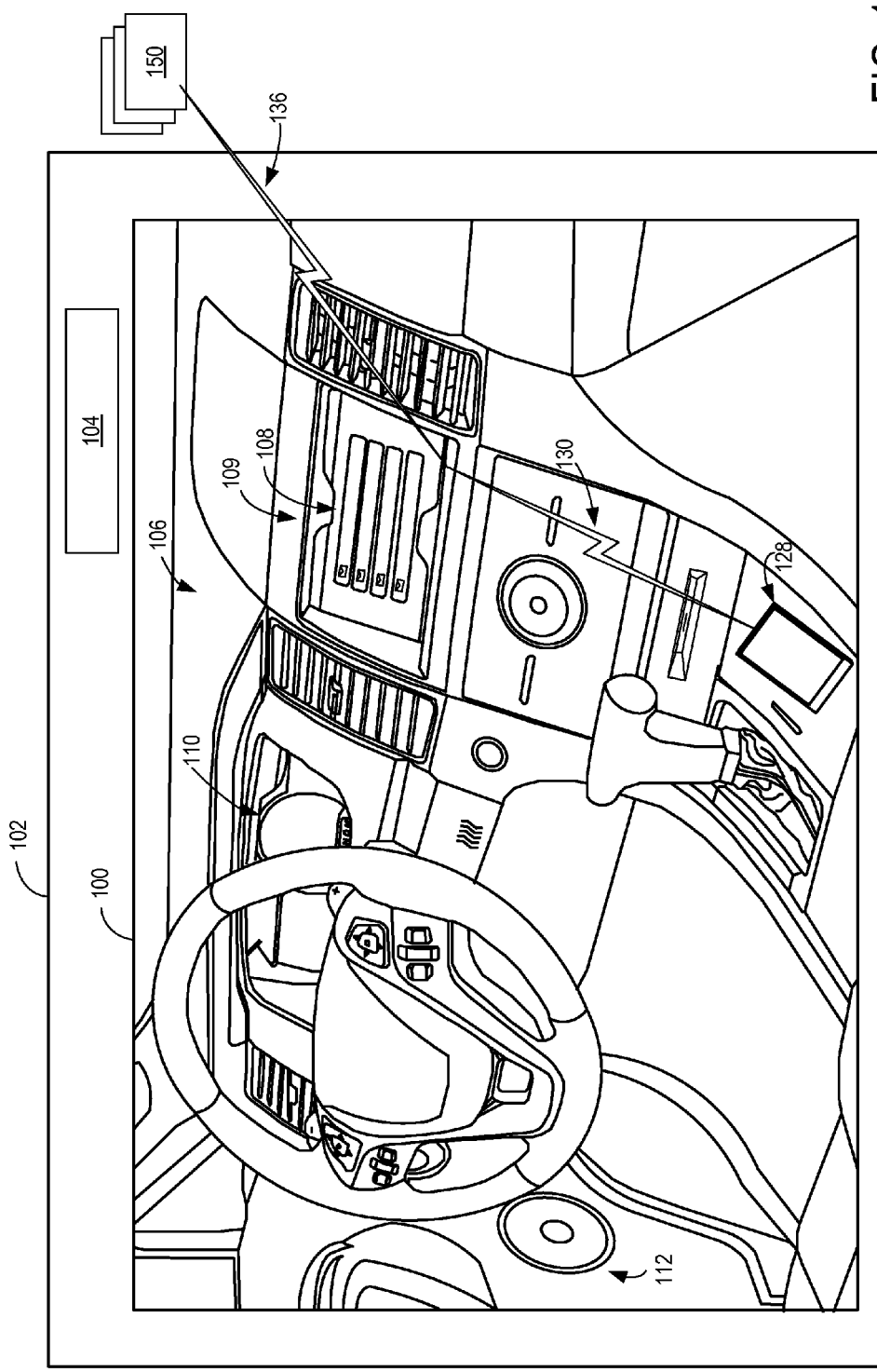
FIG. 1 shows an example partial view of a vehicle cabin in accordance with one or more embodiments of the present disclosure.

FIG. 1 shows an example partial view of one type of environment for a communication system: an interior of a cabin 100 of a vehicle 102, in which a driver and/or one or more passengers may be seated. Vehicle 102 of FIG. 1 may be a motor vehicle including drive wheels (not shown) and an internal combustion engine 104. Internal combustion engine 104 may include one or more combustion chambers which may receive intake air via an intake passage and exhaust combustion gases via an exhaust passage. Vehicle 102 may be a road automobile, among other types of vehicles. In some examples, vehicle 102 may include a hybrid propulsion system including an energy conversion device operable to absorb energy from vehicle motion and/or the engine and convert the absorbed energy to an energy form suitable for storage by an energy storage device. Vehicle 102 may include a fully electric vehicle, incorporating fuel cells, solar energy capturing elements, and/or other energy storage systems for powering the vehicle.

As shown, an instrument panel 106 may include various displays and controls accessible to a driver (also referred to as the user) of vehicle 102. For example, instrument panel 106 may include a touch screen 108 of an in-vehicle computing system 109 (e.g., an infotainment system), an audio system control panel, and an instrument cluster 110. While the example system shown in FIG. 1 includes audio system controls that may be performed via a user interface of in-vehicle computing system 109, such as touch screen 108 without a separate audio system control panel, in other embodiments, the vehicle may include an audio system control panel, which may include controls for a conventional vehicle audio system such as a radio, compact disc player, MP3 player, etc. The audio system controls may include features for controlling one or more aspects of audio output via speakers 112 of a vehicle speaker system. For example, the in-vehicle computing system or the audio system controls may control a volume of audio output, a distribution of sound among the individual speakers of the vehicle speaker system, an equalization of audio signals, and/or any other aspect of the audio output. In further examples, in-vehicle computing system 109 may adjust a radio station selection, a playlist selection, a source of audio input (e.g., from radio or CD or MP3), etc., based on user input received directly via touch screen 108, or based on data regarding the user (such as a physical state and/or environment of the user) received via external devices 150 and/or mobile device 128.

In some embodiments, one or more hardware elements of in-vehicle computing system 109, such as touch screen 108, a display screen, various control dials, knobs and buttons, memory, processor(s), and any interface elements (e.g., connectors or ports) may form an integrated head unit that is installed in instrument panel 106 of the vehicle. The head unit may be fixedly or removably attached in instrument panel 106. In additional or alternative embodiments, one or more hardware elements of the in-vehicle computing system may be modular and may be installed in multiple locations of the vehicle.

The cabin 100 may include one or more sensors for monitoring the vehicle, the user, and/or the environment. For example, the cabin 100 may include one or more seat-mounted pressure sensors configured to measure the pressure applied to the seat to determine the presence of a user, door sensors configured to monitor door activity, humidity sensors to measure the humidity content of the cabin, microphones to receive user input in the form of voice commands, to enable a user to conduct telephone calls, and/or to measure ambient noise in the cabin 100, etc. It is to be understood that the above-described sensors and/or one or more additional or alternative sensors may be positioned in any suitable location of the vehicle. For example, sensors may be positioned in an engine compartment, on an external surface of the vehicle, and/or in other suitable locations for providing information regarding the operation of the vehicle, ambient conditions of the vehicle, a user of the vehicle, etc. Information regarding ambient conditions of the vehicle, vehicle status, or vehicle driver may also be received from sensors external to/separate from the vehicle (that is, not part of the vehicle system), such as sensors coupled to external devices 150 and/or mobile device 128.

Cabin 100 may also include one or more user objects, such as mobile device 128, that are stored in the vehicle before, during, and/or after travelling. The mobile device 128 may include a smart phone, a tablet, a laptop computer, a portable media player, and/or any suitable mobile computing device. The mobile device 128 may be connected to the in-vehicle computing system via communication link 130. The communication link 130 may be wired (e.g., via Universal Serial Bus [USB], Mobile High-Definition Link [MHL], High-Definition Multimedia Interface [HDMI], Ethernet, etc.) or wireless (e.g., via BLUETOOTH, WI-FI, Near-Field Communication [NFC], cellular connectivity, etc.) and configured to provide two-way communication between the mobile device and the in-vehicle computing system. For example, the communication link 130 may provide sensor and/or control signals from various vehicle systems (such as vehicle audio system, climate control system, etc.) and the touch screen 108 to the mobile device 128 and may provide control and/or display signals from the mobile device 128 to the in-vehicle systems and the touch screen 108. The communication link 130 may also provide power to the mobile device 128 from an in-vehicle power source in order to charge an internal battery of the mobile device.

In-vehicle computing system 109 may also be communicatively coupled to additional devices operated and/or accessed by the user but located external to vehicle 102, such as one or more external devices 150. In the depicted embodiment, external devices are located outside of vehicle 102 though it will be appreciated that in alternate embodiments, external devices may be located inside cabin 100. The external devices may include a server computing system, personal computing system, portable electronic device, electronic wrist band, electronic head band, portable music player, electronic activity tracking device, pedometer, smartwatch, GPS system, etc. External devices 150 may be connected to the in-vehicle computing system via communication link 136 which may be wired or wireless, as discussed with reference to communication link 130, and configured to provide two-way communication between the external devices and the in-vehicle computing system. For example, external devices 150 may include one or more sensors and communication link 136 may transmit sensor output from external devices 150 to in-vehicle computing system 109 and touch screen 108. External devices 150 may also store and/or receive information regarding contextual data, user behavior/preferences, operating rules, etc. and may transmit such information from the external devices 150 to in-vehicle computing system 109 and touch screen 108.

In-vehicle computing system 109 may analyze the input received from external devices 150, mobile device 128, and/or other input sources and select settings for various in-vehicle systems (such as climate control system or audio system), provide output via touch screen 108 and/or speakers 112, communicate with mobile device 128 and/or external devices 150, and/or perform other actions based on the assessment. In some embodiments, all or a portion of the assessment may be performed by the mobile device 128 and/or the external devices 150.

In some embodiments, one or more of the external devices 150 may be communicatively coupled to in-vehicle computing system 109 indirectly, via mobile device 128 and/or another of the external devices 150. For example, communication link 136 may communicatively couple external devices 150 to mobile device 128 such that output from external devices 150 is relayed to mobile device 128. Data received from external devices 150 may then be aggregated at mobile device 128 with data collected by mobile device 128, the aggregated data then transmitted to in-vehicle computing system 109 and touch screen 108 via communication link 130. Similar data aggregation may occur at a server system and then transmitted to in-vehicle computing system 109 and touch screen 108 via communication link 136/130.

In the example environment illustrated in FIG. 1, the in-vehicle computing system 109 may be connected to one or more vehicle systems, such as speakers 112, display 108, vehicle sensors, and/or other suitable vehicle systems via any suitable network. In some examples, the in-vehicle computing system 109 includes a talker device configured to transmit audio/video data to listener devices, such as speakers 112 and display 108 via a network. The network may be configured in accordance with Layer 2 of the Open Systems Interconnection (OSI) model, in which routing and forwarding decisions or determinations in the network may be performed on a media access control (MAC) addressing basis. An example Layer 2 network may be an Ethernet Audio/Video Bridging (AVB) network. For Layer 2 networks configured as AVB networks, the talkers and the listeners may be configured to communicate over the AVB network using various AVB standards and protocols, including the Institute of Electrical and Electronics Engineers (IEEE) 802.1AS-2011 (gPTP) for network timing and synchronization, IEEE 802.1Q-2011 clause 34 for queuing and forwarding streaming data, IEEE 802.1Q-2011 clause 35 (Stream Reservation Protocol (SRP)) for reserving a network connection or path and/or resources such as bandwidth for communication over the network connection, and/or IEEE 1722-2011 related to a possible data streaming format. Other AVB-related standards and protocols, and/or other versions of the AVB standards and protocols, previously, currently, or later developed, may also or alternatively be used.

It is to be understood that FIG. 1 depicts one example environment, however the communication systems and methods described herein may be utilized in any suitable environment. As another example, speakers in a professional audio environment (e.g., an arena, stadium, concert hall, amphitheater, recording studio, etc.) may be utilized as listeners that receive audio data from a talker device (e.g., a mixing console, audio/video receiver, etc.) over an AVB network. Any suitable devices that transmit and/or receive packets may be utilized as the systems and/or to perform the methods described herein.

Figure 2:
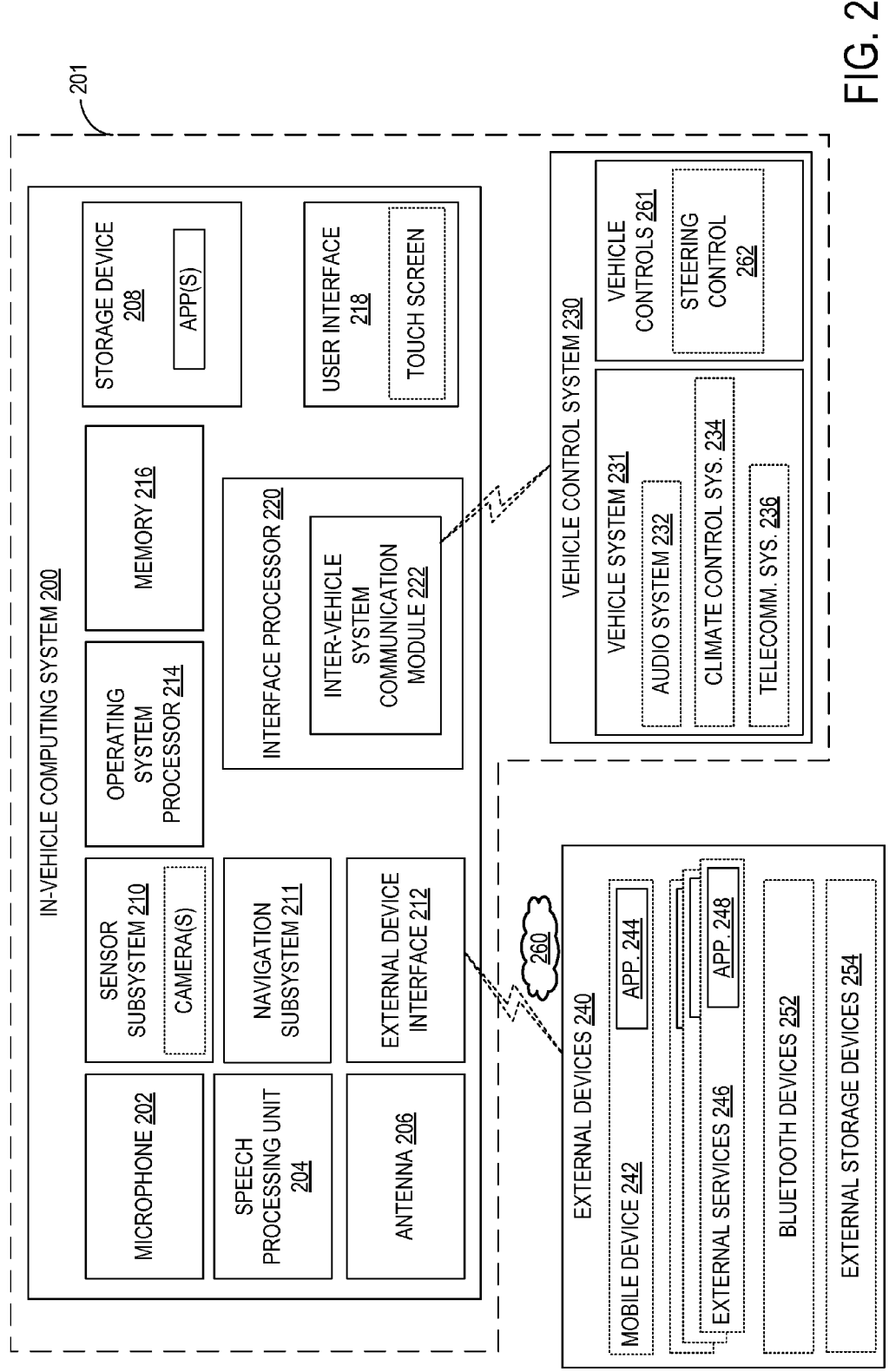
FIG. 2 shows an example in-vehicle computing system in accordance with one or more embodiments of the present disclosure.

FIG. 2 shows a block diagram of an in-vehicle computing system 200 configured and/or integrated inside vehicle 201. In-vehicle computing system 200 may be an example of in-vehicle computing system 109 of FIG. 1 and/or may perform one or more of the methods described herein in some embodiments. In some examples, the in-vehicle computing system may be a vehicle infotainment system configured to provide information-based media content (audio and/or visual media content, including entertainment content, navigational services, etc.) to a vehicle user to enhance the operator's in-vehicle experience. The in-vehicle computing system may include, or be coupled to, various vehicle systems, sub-systems, hardware components, as well as software applications and systems that are integrated in, or integratable into, vehicle 201 in order to enhance an in-vehicle experience for a driver and/or a passenger.

In-vehicle computing system 200 may include one or more processors including an operating system processor 214 and an interface processor 220. Operating system processor 214 may execute an operating system on the in-vehicle computing system, and control input/output, display, playback, and other operations of the in-vehicle computing system. Interface processor 220 may interface with a vehicle control system 230 via an inter-vehicle system communication module 222.

Inter-vehicle system communication module 222 may output data to other vehicle systems 231 and vehicle control elements 261, while also receiving data input from other vehicle components and systems 231, 261, e.g. by way of vehicle control system 230. When outputting data, inter-vehicle system communication module 222 may provide a signal via a bus corresponding to any status of the vehicle, the vehicle surroundings, or the output of any other information source connected to the vehicle. Vehicle data outputs may include, for example, analog signals (such as current velocity), digital signals provided by individual information sources (such as clocks, thermometers, location sensors such as Global Positioning System [GPS] sensors, etc.), digital signals propagated through vehicle data networks (such as an engine controller area network [CAN] bus through which engine-related information may be communicated, a climate control CAN bus through which climate control-related information may be communicated, and a multimedia data network through which multimedia data is communicated between multimedia components in the vehicle). For example, the in-vehicle computing system may retrieve from the engine CAN bus the current speed of the vehicle estimated by the wheel sensors, a power state of the vehicle via a battery and/or power distribution system of the vehicle, an ignition state of the vehicle, etc. In addition, other interfacing means such as Ethernet may be used as well without departing from the scope of this disclosure.

A non-volatile storage device 208 may be included in in-vehicle computing system 200 to store data such as instructions executable by processors 214 and 220 in non-volatile form. The storage device 208 may store application data to enable the in-vehicle computing system 200 to run an application for connecting to a cloud-based server and/or collecting information for transmission to the cloud-based server. The application may retrieve information gathered by vehicle systems/sensors, input devices (e.g., user interface 218), devices in communication with the in-vehicle computing system (e.g., a mobile device connected via a BLUETOOTH link), etc. In-vehicle computing system 200 may further include a volatile memory 216. Volatile memory 216 may be random access memory (RAM). Non-transitory storage devices, such as non-volatile storage device 208 and/or volatile memory 216, may store instructions and/or code that, when executed by a processor (e.g., operating system processor 214 and/or interface processor 220), controls the in-vehicle computing system 200 to perform one or more actions described in the disclosure.

A microphone 202 may be included in the in-vehicle computing system 200 to receive voice commands from a user, to measure ambient noise in the vehicle, to determine whether audio from speakers of the vehicle is tuned in accordance with an acoustic environment of the vehicle, etc. A speech processing unit 204 may process voice commands, such as the voice commands received from the microphone 202. In some embodiments, in-vehicle computing system 200 may also be able to receive voice commands and sample ambient vehicle noise using a microphone included in an audio system 232 of the vehicle.

One or more additional sensors may be included in a sensor subsystem 210 of the in-vehicle computing system 200. For example, the sensor subsystem 210 may include a camera, such as a rear view camera for assisting a user in parking the vehicle and/or a cabin camera for identifying a user (e.g., using facial recognition and/or user gestures).

Sensor subsystem 210 of in-vehicle computing system 200 may communicate with and receive inputs from various vehicle sensors and may receive user inputs. For example, the inputs received by sensor subsystem 210 may include transmission gear position, transmission clutch position, gas pedal input, brake input, transmission selector position, vehicle speed, engine speed, mass airflow through the engine, ambient temperature, intake air temperature, etc., as well as inputs from climate control system sensors (such as heat transfer fluid temperature, antifreeze temperature, fan speed, passenger compartment temperature, desired passenger compartment temperature, ambient humidity, etc.), an audio sensor detecting voice commands issued by a user, a fob sensor receiving commands from and optionally tracking the geographic location/proximity of a fob of the vehicle, etc. While certain vehicle system sensors may communicate with sensor subsystem 210 alone, other sensors may communicate with both sensor subsystem 210 and vehicle control system 230, or may communicate with sensor subsystem 210 indirectly via vehicle control system 230.

A navigation subsystem 211 of in-vehicle computing system 200 may generate and/or receive navigation information such as location information (e.g., via a GPS sensor and/or other sensors from sensor subsystem 210), route guidance, traffic information, point-of-interest (POI) identification, and/or provide other navigational services for the driver.

External device interface 212 of in-vehicle computing system 200 may be coupled to and/or communicate with one or more external devices 240 located external to vehicle 201. It is to be understood that although external device interface 212 is illustrated as a single interface, multiple external device interfaces (e.g., operable to communicate via different wireless carriers, for example) may be included in in-vehicle computing system 200. While the external devices are illustrated as being located external to vehicle 201, it is to be understood that they may be temporarily housed in vehicle 201, such as when the user is operating the external devices while operating vehicle 201. In other words, the external devices 240 are not integral to vehicle 201. The external devices 240 may include a mobile device 242 (e.g., connected via a BLUETOOTH connection) or an alternate BLUETOOTH-enabled device 252. Mobile device 242 may be a mobile phone, smart phone, wearable devices/sensors that may communicate with the in-vehicle computing system via wired and/or wireless communication, and/or other portable electronic device(s). Other external devices include external services 246 (e.g., remote server systems). For example, the external devices may include extra-vehicular devices that are separate from and located externally to the vehicle. Still other external devices include external storage devices 254, such as solid-state drives, pen drives, USB drives, etc. External devices 240 may communicate with in-vehicle computing system 200 either wirelessly or via connectors without departing from the scope of this disclosure. For example, external devices 240 may communicate with in-vehicle computing system 200 through the external device interface 212 over network 260, a universal serial bus (USB) connection, a direct wired connection, a direct wireless connection, and/or other communication link. The external device interface 212 may provide a communication interface to enable the in-vehicle computing system to communicate with mobile devices associated with contacts of the driver. For example, the external device interface 212 may enable phone calls to be established and/or text messages (e.g., SMS, MMS, etc.) to be sent (e.g., via a cellular communications network) to a mobile device associated with a contact of the driver.

One or more applications 244 may be operable on mobile device 242. As an example, mobile device application 244 may be operated to aggregate user data regarding interactions of the user with the mobile device. For example, mobile device application 244 may aggregate data regarding music playlists listened to by the user on the mobile device, telephone call logs (including a frequency and duration of telephone calls accepted by the user), positional information including locations frequented by the user and an amount of time spent at each location, etc. The collected data may be transferred by application 244 to external device interface 212 over network 260. In addition, specific user data requests may be received at mobile device 242 from in-vehicle computing system 200 via the external device interface 212. The specific data requests may include requests for determining where the user is geographically located, an ambient noise level and/or music genre at the user's location, an ambient weather condition (temperature, humidity, etc.) at the user's location, image data captured by a camera integrated into the mobile device, etc. Mobile application 244 may send control instructions to components (e.g., microphone, etc.) or other applications (e.g., navigational applications) of mobile device 242 to enable the requested data to be collected on the mobile device. Mobile device application 244 may then relay the collected information back to in-vehicle computing system 200.

Likewise, one or more applications 248 may be operable on external services 246. As an example, external services applications 248 may be operated to aggregate and/or analyze data from multiple data sources. For example, external services applications 248 may aggregate data from one or more social media accounts of the user, data from the in-vehicle computing system (e.g., sensor data, log files, user input, etc.), data from an internet query (e.g., weather data, POI data), etc. The collected data may be transmitted to another device and/or analyzed by the application to determine a context of the driver, vehicle, and environment and perform an action based on the context (e.g., requesting/sending data to other devices).

Vehicle control system 230 may include controls for controlling aspects of various vehicle systems 231 involved in different in-vehicle functions. These may include, for example, controlling aspects of vehicle audio system 232 for providing audio entertainment to the vehicle occupants, aspects of climate control system 234 for meeting the cabin cooling or heating needs of the vehicle occupants, as well as aspects of telecommunication system 236 for enabling vehicle occupants to establish telecommunication linkage with others.

Audio system 232 may include one or more acoustic reproduction devices including electromagnetic transducers such as speakers. Vehicle audio system 232 may be passive or active such as by including a power amplifier. In some examples, in-vehicle computing system 200 may be the only audio source for the acoustic reproduction device or there may be other audio sources that are connected to the audio reproduction system (e.g., external devices such as a mobile phone). The connection of any such external devices to the audio reproduction device may be analog, digital, or any combination of analog and digital technologies.

Climate control system 234 may be configured to provide a comfortable environment within the cabin or passenger compartment of vehicle 201. Climate control system 234 includes components enabling controlled ventilation such as air vents, a heater, an air conditioner, an integrated heater and air-conditioner system, etc. Other components linked to the heating and air-conditioning setup may include a windshield defrosting and defogging system capable of clearing the windshield and a ventilation-air filter for cleaning outside air that enters the passenger compartment through a fresh-air inlet.

Vehicle control system 230 may also include controls for adjusting the settings of various vehicle controls 261 (or vehicle system control elements) related to the engine and/or auxiliary elements within a cabin of the vehicle, such as steering wheel controls 262 (e.g., steering wheel-mounted audio system controls, cruise controls, windshield wiper controls, headlight controls, turn signal controls, etc.), instrument panel controls, microphone(s), accelerator/brake/clutch pedals, a gear shift, door/window controls positioned in a driver or passenger door, seat controls, cabin light controls, audio system controls, cabin temperature controls, etc. Vehicle controls 261 may also include internal engine and vehicle operation controls (e.g., engine controller module, actuators, valves, etc.) that are configured to receive instructions via the CAN bus of the vehicle to change operation of one or more of the engine, exhaust system, transmission, and/or other vehicle system. The control signals may also control audio output at one or more speakers of the vehicle's audio system 232. For example, the control signals may adjust audio output characteristics such as volume, equalization, audio image (e.g., the configuration of the audio signals to produce audio output that appears to a user to originate from one or more defined locations), audio distribution among a plurality of speakers, etc. Likewise, the control signals may control vents, air conditioner, and/or heater of climate control system 234. For example, the control signals may increase delivery of cooled air to a specific section of the cabin.

Control elements positioned on an outside of a vehicle (e.g., controls for a security system) may also be connected to computing system 200, such as via communication module 222. The control elements of the vehicle control system may be physically and permanently positioned on and/or in the vehicle for receiving user input. In addition to receiving control instructions from in-vehicle computing system 200, vehicle control system 230 may also receive input from one or more external devices 240 operated by the user, such as from the mobile device 242. This allows aspects of vehicle systems 231 and vehicle controls 261 to be controlled based on user input received from the external devices 240.

In-vehicle computing system 200 may further include an antenna 206. Antenna 206 is shown as a single antenna, but may comprise one or more antennas in some embodiments. The in-vehicle computing system may obtain broadband wireless internet access via antenna 206, and may further receive broadcast signals such as radio, television, weather, traffic, and the like. The in-vehicle computing system may receive positioning signals such as GPS signals via one or more antennas 206. The in-vehicle computing system may also receive wireless commands via RF such as via antenna(s) 206 or via infrared or other means through appropriate receiving devices. In some embodiments, antenna 206 may be included as part of audio system 232 or telecommunication system 236. Additionally, antenna 206 may provide AM/FM radio signals to external devices 240 (such as to mobile device 242) via external device interface 212.

One or more elements of the in-vehicle computing system 200 may be controlled by a user via user interface 218. User interface 218 may include a graphical user interface presented on a touch screen, such as touch screen 108 of FIG. 1, and/or user-actuated buttons, switches, knobs, dials, sliders, etc. For example, user-actuated elements may include steering wheel controls, door and/or window controls, instrument panel controls, audio system settings, climate control system settings, and the like. A user may also interact with one or more applications of the in-vehicle computing system 200 and mobile device 242 via user interface 218. In addition to receiving a user's vehicle setting preferences on user interface 218, vehicle settings selected by in-vehicle control system may be displayed to a user on user interface 218. Notifications and other messages (e.g., received messages), as well as navigational assistance, may be displayed to the user on a display of the user interface. User preferences/information and/or responses to presented messages may be performed via user input to the user interface.

As described above, an in-vehicle computing system may communicate with an external device, such as a mobile phone located in the vehicle. For example, a driver may connect his/her mobile phone to the in-vehicle computing system in order to route incoming phone calls to the in-vehicle computing system (e.g., so that the driver is able to make/receive hands-free phone calls), playback media stored on the mobile device through in-vehicle speakers/display, and/or to otherwise extend functionality of the mobile device and/or in-vehicle systems. Similarly, multiple mobile devices (e.g., smartphones, laptops, tablets, stand-alone navigation systems, wearable devices, etc.) within a communicative distance of one another (e.g., within range of a wireless data transmission system) may communicate with one another to extend or enhance functionality of one, some, or all of the devices. Such devices may have one or more wireless communication systems, each having different features, so the devices may negotiate to determine which medium is to be used during communication.

During negotiations, devices may initially connect via a Near Field Communication (NFC) wireless communication protocol. NFC allows devices to communicate with one another via radio communication while the devices are in very close proximity to one another. An example range for NFC is 3.9 inches or less. In this way, devices that are outside of close range (e.g., greater than 3.9 inches apart using the above example) are not able to communicate with one another. Devices that are within close range (e.g., within 3.9 inches of one another in the above example) may communicate with one another via NFC (e.g., once any other authentication, compatibility, and/or other operations/checks are successfully performed). The proximity-dependent nature of NFC allows authentication procedures to be relaxed relative to other communication mediums, as the close range limits the number of devices that could even attempt to communicate via the NFC protocol. Accordingly, devices may initially connect via NFC, then negotiate over NFC to determine another communication mechanism that allows the devices more freedom of movement relative to one another.

Figure 3:
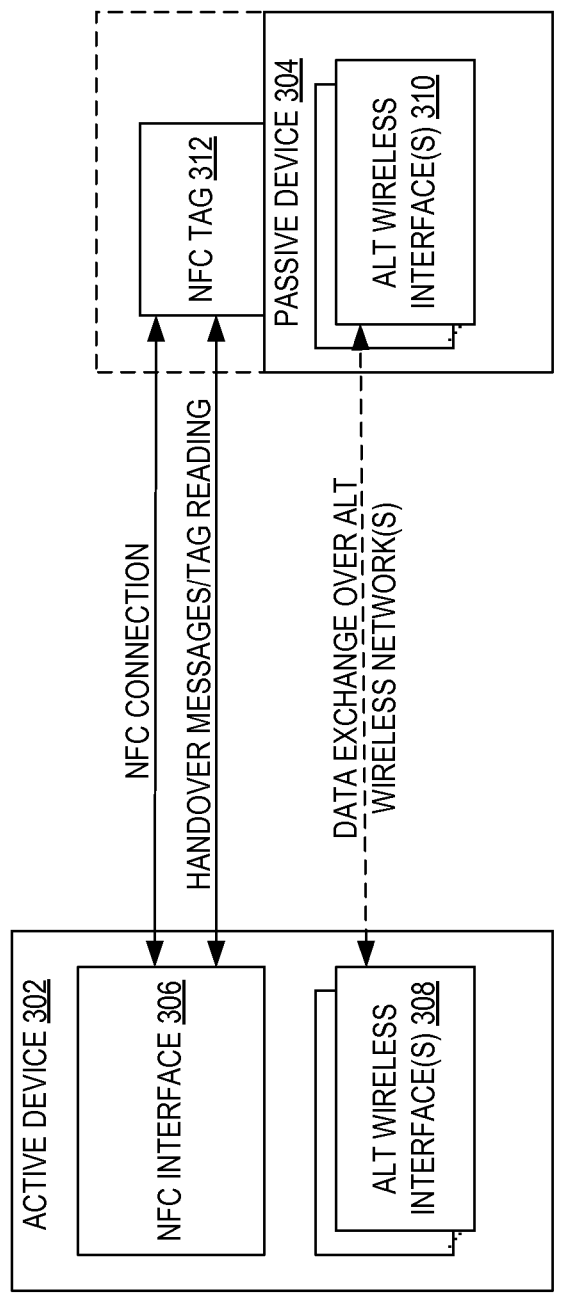
FIG. 3 shows an example block diagram of an active and a passive device in accordance with one or more embodiments of the present disclosure.

FIG. 3 shows an example block diagram of two devices that may negotiate via NFC communication before selecting an alternative wireless communication protocol over which communication may continue. In the example of FIG. 3, an active device 302 and a passive device 304 are shown in order to illustrate an example static handover technique between two devices. The active device 302 and/or the passive device 304 may correspond to any suitable devices, including but not limited to an in-vehicle computing system (e.g., in-vehicle computing system 200 of FIG. 2), a mobile device (e.g., a smartphone, a laptop, a tablet, a wearable device, etc.), and/or any other device equipped for communication via NFC. For example, the passive device 304 may include a passive tag or an active NFC device (e.g., including an NFC transceiver) emulating a tag. It is to be understood that a single active device and a single passive device are illustrated for simplicity, although any number of devices may perform the static handover described herein.

Active device 302 includes an NFC interface 306 that is configured to carry out NFC-compliant two-way communications (e.g., according to ISO/IEC 18092/ECMA-340, ISO/IEC 21481/ECMA-352, ISO/IEC 14443, and/or ISO 13157 protocols or other future NFC protocols). NFC interface 306 may include hardware or a combination of hardware and software that forms an NFC Forum Device. The NFC Forum device may be configured (e.g., including antennas and modulation circuitry) to communicate (e.g., transmit and receive) over a 13.56 MHz band using ISO/IEC 18000-3 air interface protocols at bit rates ranging from 106 kbits/s to 424 kbits/s. Active device 302 may also include alternative wireless interfaces 308 configured to communicate over other wireless carriers than NFC, such as BLUETOOTH, WI-FI, and/or other suitable wireless carriers. For example, active device 302 may include a BLUETOOTH wireless interface configured (e.g., including antennas and modulation circuitry) to communicate (e.g., transmit and receive) over a 2.4-2.5 GHz band at bit rates that reach 1-2.1 Mbit/s. The BLUETOOTH wireless interface may be compliant with IEEE 802.15.1 standards and/or any other future BLUETOOTH protocols/standards. Active device 302 may additionally or alternatively include a WI-FI wireless interface configured (e.g., including antennas and modulation circuitry) to communicate (e.g., transmit and receive) over a 2.4 and/or 5 GHz band. The WI-FI wireless interface may be compliant with IEEE 802.11 standards and/or any other future WI-FI protocols/standards. Although NFC, BLUETOOTH, and WI-FI wireless communication will be discussed herein as exemplary wireless communication mechanisms, it is to be understood that other wireless communication mechanisms may be used in addition to and/or as an alternative to the wireless communication described herein. For example, the alternative wireless interfaces described herein may include interfaces configured for communication over other wireless carriers (e.g., via other wireless protocols), such as ZigBee, cellular networks, 6LoWPAN, Wireless USB, and/or any other suitable wireless protocol.

Passive device 304 includes alternative wireless interfaces 310, which may include one or more of the same alternative wireless interfaces as active device 302. In general, alternative wireless interfaces 310 of passive device 304 may include any of the alternative wireless interfaces described above with respect to the active device. Instead of including an NFC interface, such as the NFC interface 306 included in active device 302, passive device 304 may include and/or be attached to a passive NFC tag 312. NFC tag 312 may not be powered, and may be configured to store data readable via an NFC connection. NFC tag 312 may be an unpowered chip that includes data storage (e.g., between 96 and 4096 bytes of memory) that may be read-only or rewriteable. The NFC tag may be integrated into the passive device and/or may include a separate chip that is attachable/mountable/coupleable to the passive device (e.g., via an adhesion mechanism). In this way, the NFC tag may be transferrable to other devices and may be associated with the device to which it is attached/mounted/coupled.

The NFC tag 312 may store data that is encoded based on the NFC standards/protocols described above. In this example, the NFC tag may store data corresponding to a Handover Select Record to allow the devices to switch from NFC communication to an alternative wireless communication mechanism. The Handover Select Record will be described in more detail below with respect to FIG. 4. As illustrated in FIG. 3, communication between the NFC interface 306 of active device 302 and the NFC tag 312 of passive device 304 may be performed to allow data to be exchanged over at least one of the alternative wireless interfaces.

Figure 4:
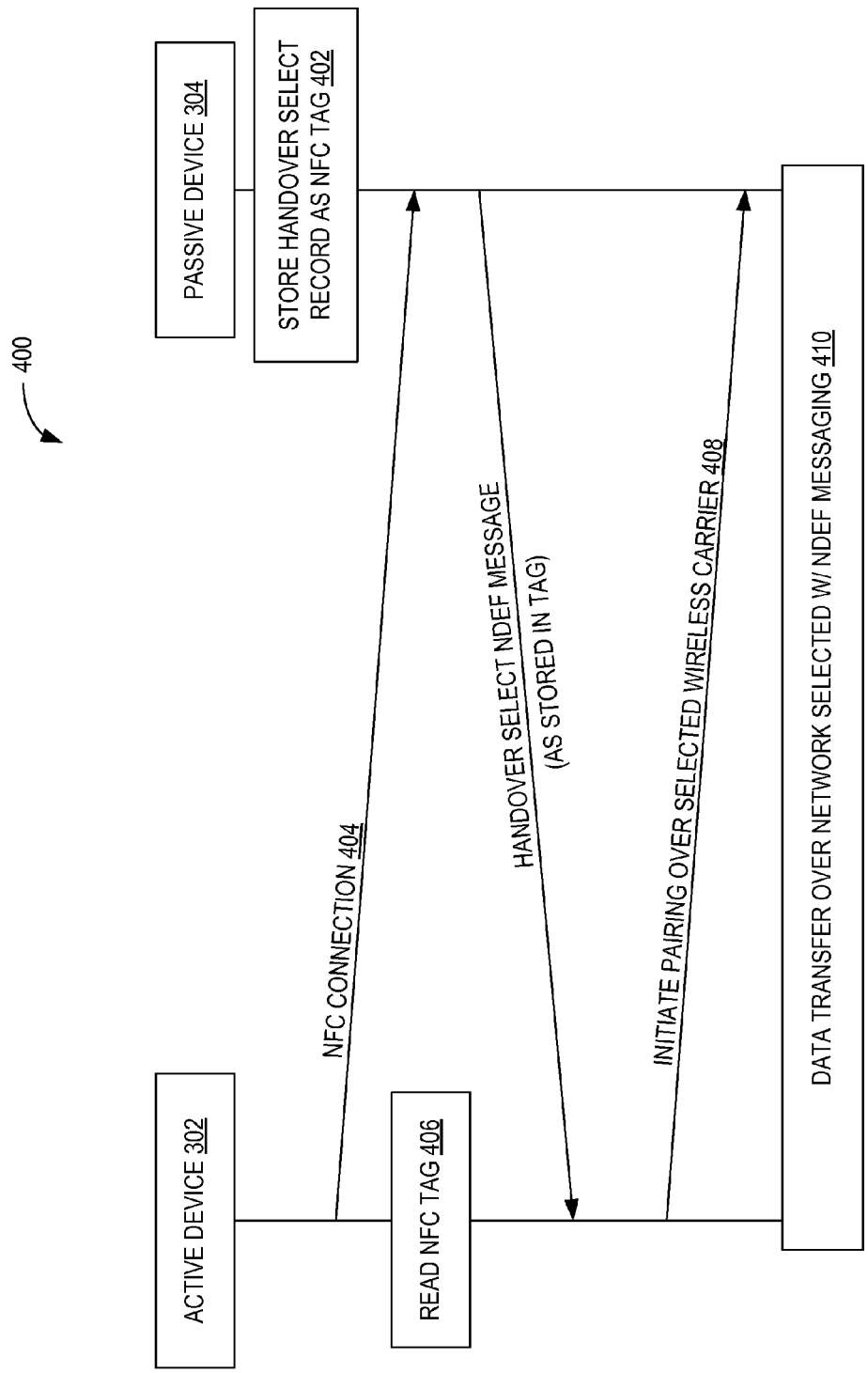
FIG. 4 shows an example communication diagram for static handover in accordance with one or more embodiments of the present disclosure.

FIG. 4 shows an example communication diagram 400 for static handover performed via active device 302 and passive device 304 of FIG. 3. At 402, the passive device stores a Handover Select Record as an NFC tag (e.g., NFC tag 312 of FIG. 2). For example, 402 may occur when the NFC tag is written (e.g., when the Handover Select Record is stored in the memory of the NFC tag) and/or when the NFC tag is attached to the passive device. At 404, active device 302 may initiate an NFC connection with the passive device 304. For example, the active device may be touched to the passive device, and/or brought into a threshold range (e.g., within 3.9 inches) of the passive device in order to initiate an NFC connection. At 406, active device 302 reads the NFC tag of the passive device 304. As described above, the passive device 304 includes/stores a Handover Select Record, which may include types of information that are included in a Handover Select NFC Data Exchange Format (NDEF) message. The Handover Select Record (and/or a Handover Select NDEF message) may specify one or more alternative wireless communication mechanisms over which the passive device is able to communicate and/or prefers (has selected) to communicate. For example, the Handover Select Record/NDEF message may include a sequence of Alternative Carrier Records, which define the alternative carriers (e.g., the alternative wireless communication mechanisms and/or types of wireless networks, such as BLUETOOTH, WI-FI, etc.) that are selected. The Handover Select Record/message may only include details relating to the selected alternative carriers and may not include any details relating to alternative carriers that are not selected. For example, the Handover Select Record/message may include a physical device (e.g., interface) name/address/identifier and/or network name/address/identifier for the selected carrier. The Select Record/message may also include authentication information for pairing via the selected carrier, such as a user name and password if it is possible for the passive device 304 to include this dynamic information. For example, the passive device 304 may include such information if the passive device 304 is and/or includes an emulated NFC tag. A handover server (discussed in more detail below with respect to FIG. 6) may not be involved during performance of static handover, as the active device reads the tags (e.g., storing an NDEF Select message/Handover Select Record) of the passive device, and based on the selected alternate carrier (e.g., as included in the Select Record/message), the active device may initiate the connection to the passive device via the selected alternate carrier.

Based on the alternative wireless communication mechanisms that are specified in the Handover Select NDEF message stored in the NFC tag, the active device initiates pairing over the selected wireless carrier, as shown at 408. If only one alternative carrier is specified in the Handover Select NDEF message, the active device may initiate pairing over that alternative carrier. If more than one alternative carrier is specified in the Select message, the active device may select one of the alternative carriers based on a preference indicated in the Select message (e.g., based on the order in which the carriers are listed in the Select message) and/or based on a selection mechanism at the active device. For example, the active device may select an alternative carrier based on capabilities of the active device, ongoing or planned communications of the active device (e.g., if a BLUETOOTH carrier is being used for communication with another device, the active device 302 may select to use the WI-FI carrier to communicate with the passive device 304), network conditions on the different carriers indicated in the Select message, operating conditions of the active device (e.g., location, historical usage, power status, etc.), and/or any other suitable factors or combination of factors. The active device may also attempt to connect to multiple alternative carriers simultaneously. Initiating pairing over the selected wireless carrier may include performing authentication, handshaking, and/or other operations specific to that carrier and/or protocols associated with that carrier (e.g., the BLUETOOTH and WI-FI protocols described above). For example, the initiation of communication over the selected wireless carrier may include sending a confirmation message over the selected wireless carrier. At 410, data is transferred between the active device 302 and the passive device 304 (e.g., via two way communication) over the network selected with the NDEF messaging (e.g., the carrier selected based on the NDEF Select message and/or the active device 302 and over which pairing is initiated at 408).

Figure 5:
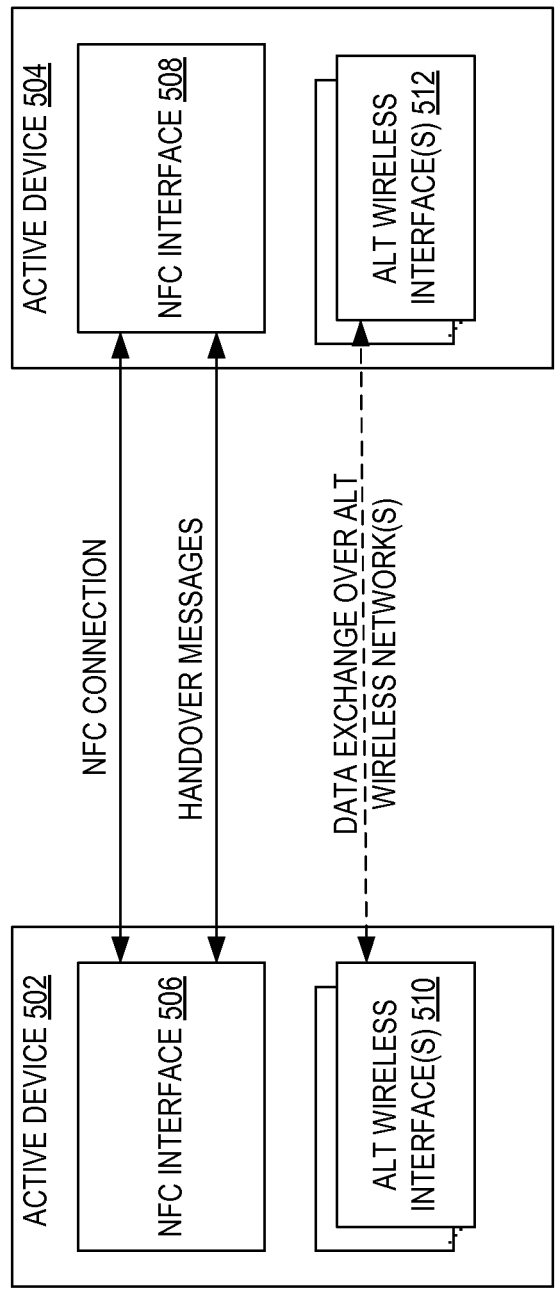
FIG. 5 shows an example block diagram of two active devices in accordance with one or more embodiments of the present disclosure.

FIG. 5 shows a block diagram of example active devices 502 and 504 that may negotiate via NFC communication before selecting an alternative wireless communication protocol over which communication may continue. In the example of FIG. 5, two active devices 502 and 504 are shown in order to illustrate an example negotiated handover technique between two devices. As devices 502 and 504 are each examples of active devices, the description of active device 302 of FIG. 3 may apply to active devices 502 and 504 of FIG. 5. For example, NFC interfaces 506 and 508 may correspond to NFC interface 306 of FIG. 3, and alternative wireless interfaces 510 and 512 may correspond to alternative wireless interface 308 of FIG. 3.

Figure 6A:
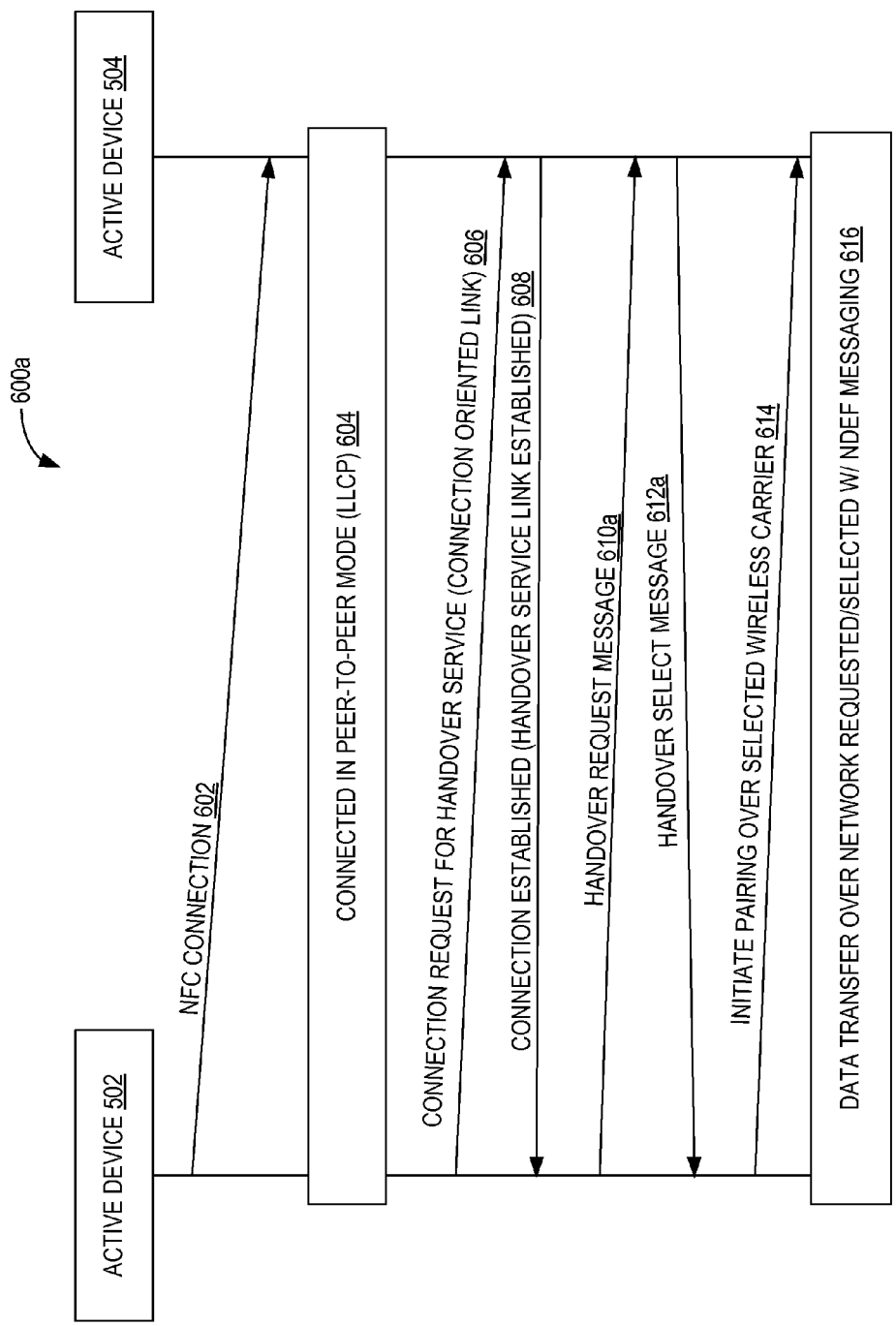
FIGS. 6A and 6B show example communication diagrams for negotiated handover in accordance with one or more embodiments of the present disclosure.
Figure 6B:
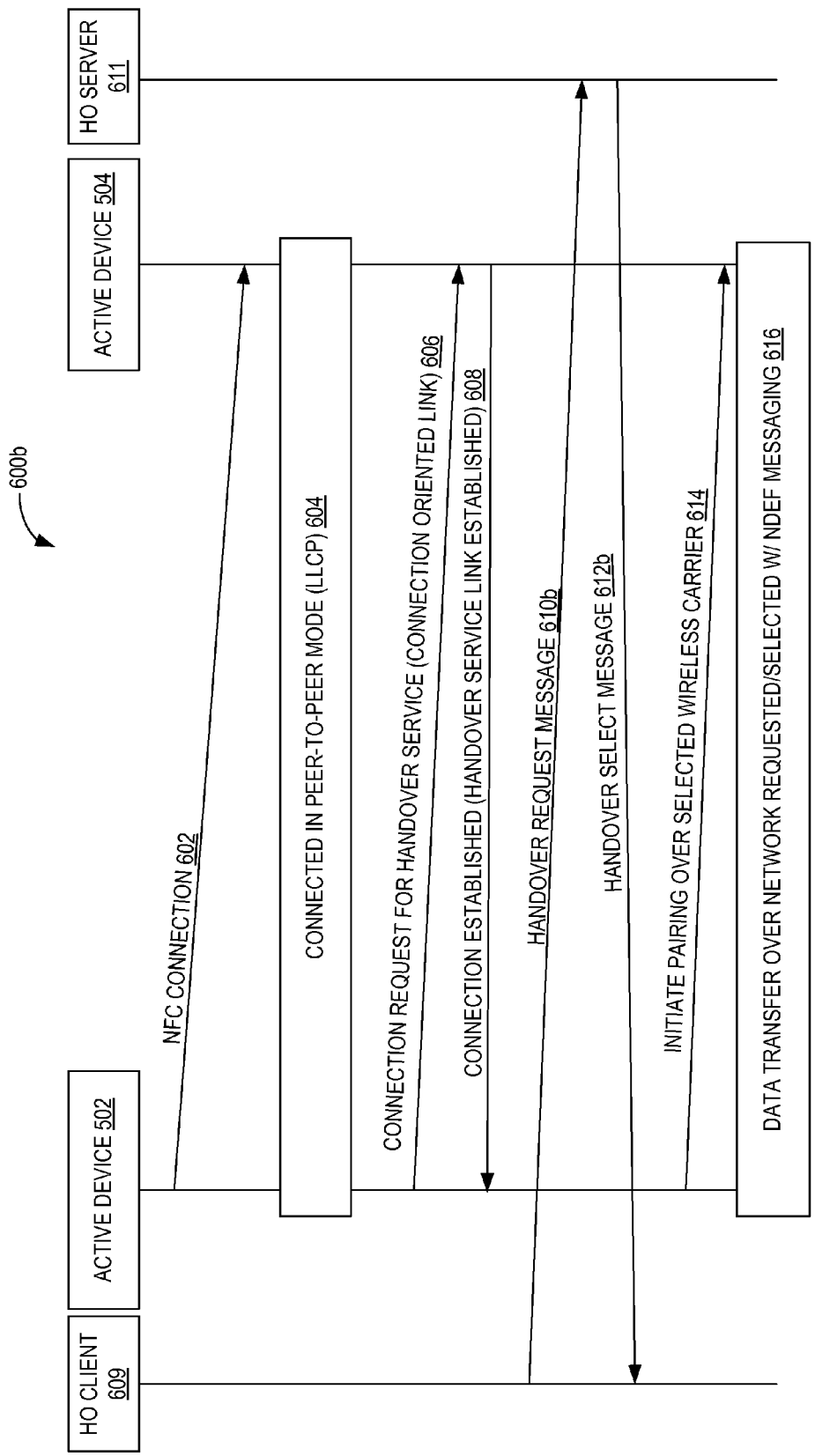

FIGS. 6A and 6B show example communication diagrams 600a and 600b for negotiated handover performed via active devices 502 and 504 of FIG. 5. Communication diagram 600a illustrates negotiated handover performed via communication between the active devices, while communication 600b illustrates the role of a handover service (which may be implemented by the active devices and/or a computing device remote, but communicatively connected, to the active devices). In each communication diagram 600a and 600b, NFC connection is made between active device 502 and active device 504 at 602. For example, the active device 502 may be touched to the active device 504, and/or brought into a threshold range (e.g., within 3.9 inches) of the active device 504 in order to initiate an NFC connection. Responsive to the initiation of NFC communication, the devices are connected via NFC peer-to-peer communication, as indicated at 604 (e.g., via a Logical Link Control Protocol [LLCP] Link that is set up once the NFC peer-to-peer connection is established). The active device 502 (e.g., serving as a requesting device) sends a connection request for handover service (e.g., via a connection oriented link) at 606 in order to establish a connection oriented connection. At 608, the connection oriented link is established, thereby establishing a handover service link. In FIG. 6A, active device 502 sends a Handover Request NDEF message to active device 504 at 610a. With this message, the active device 502 may announce its selected alternative carriers (e.g., WI-FI and BLUETOOTH wireless technology in one example). In FIG. 6B, the handover request message is sent via handover client 609 to handover server 611 at 610b. In this way, handover communication is provided over the handover service link.

The handover service may include a service running over LLCP, such that all communication to that service goes through a handover service link. The implementation of the handover service may be referred to herein as a Handover server, and before starting any communication with the server, a device (e.g., a requesting device) may establish a connection to the handover service, and, on successful connection to the handover service, a service link may be established. Once the service link connection is established, the Request message may be passed to the handover server.

Figure 9A:
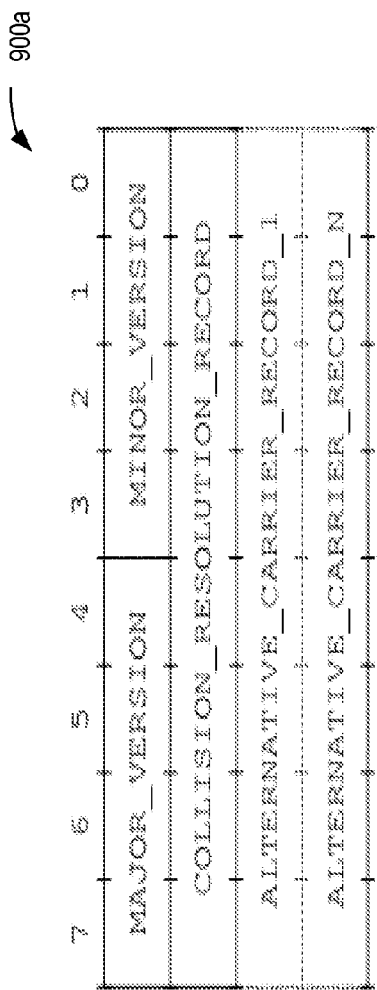
FIG. 9A shows an example Handover Request message payload in accordance with one or more embodiments of the present disclosure.
Figure 9B:
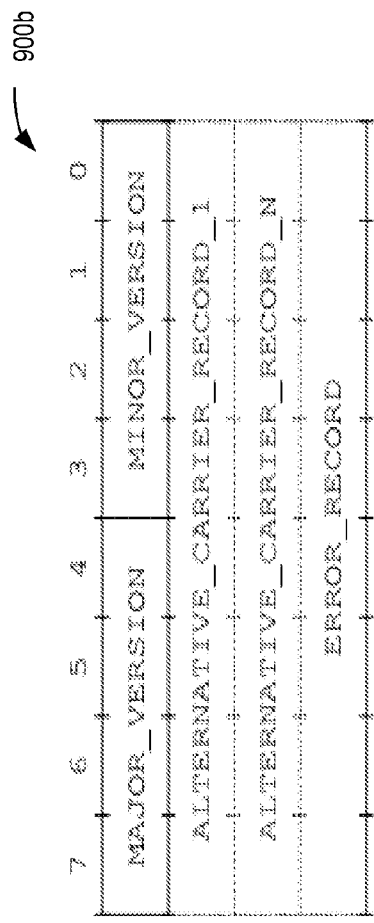
FIG. 9B shows an example Handover Select message payload in accordance with one or more embodiments of the present disclosure.

The Handover Request NDEF message may be similar to the Select message described above, however the Request message specifies alternative carriers that are requested for communication. Accordingly, the Request message may include names, addresses, and/or other identifiers of all requested carriers. An example payload of a Handover Request message 900a is shown in FIG. 9A. In comparison, an example payload of a Handover Select message 900b is shown in FIG. 9B. As shown, both types of messages may include version information indicating a protocol version (e.g., an NDEF protocol version, a SNEP protocol version, a communication protocol version, etc.) and an indication of alternative carriers (e.g., in Alternative_Carrier_Record fields). However, the Request message 900a may include a collision resolution record, while the Select message may include an error record. The different types of messages may be identifiable based on a respective header. For example, a Request message may include an "hr" designation and/or other identifying information in a respective header, while a Select message may include an "hs" designation and/or other identifying information in a respective header.

The active device 504 and/or the handover server 611 may receive the Request message, evaluate the requested alternative carriers, and select one or more of the requested carriers for continued communication. The active device 504 and/or the handover server 611 may select one or more of the requested carriers based on any suitable factors, including but not limited to those described above with respect to the active device's selection of the alternative carrier from the Select message in FIG. 4. The active device 504 and/or the handover server 611 may then generate and send a Handover Select NDEF message identifying the selected alternative carrier(s) (e.g., a subset of the requested alternative carriers and/or all of the requested alternative carriers) at 612a/612b in FIGS. 6A and 6B, respectively. In some examples, the handover server 611 sends the possible alternative communication carrier from the received Request message, indicating the alternative communication carriers that the active device 504 supports, to the active device 502/handover client 609 in a Select message.

In each of FIGS. 6A and 6B, at 614, the active device 502 initiates pairing over a selected wireless carrier, selected from the alternative wireless carriers identified in the Handover Select NDEF message sent at 612*a/b*. For example, the initiation of communication over the selected wireless carrier may include sending a confirmation message over the selected wireless carrier. The active device 502 may select an alternative carrier (e.g., a subset of the selected alternative carriers in the Select message and/or the selected alternative carrier in the Select message) as described above regarding the active device's selection of alternative carrier(s) from the Select message in FIG. 4. In contrast to the static handover protocol, in which the active device is unable to notify the passive device of all of the alternative carriers the active device supports, the negotiated handover protocol includes two stages of narrowing candidate alternative carriers (e.g., narrowing the requested carriers at the active device 504 to form a pool of selected carriers, then narrowing the selected carriers at the active device 502 to select a single candidate for which pairing is initiated). At 616, data transfer (e.g., two-way communication) is performed over the network requested/selected via the NDEF messaging (e.g., the network over which pairing is initiated at 614). It is to be understood that, in examples where more than one alternative carrier is identified in the Handover Select message at 612*a/b*, the active device 502 may first attempt to initiate pairing over one alternative carrier identified in the Select message, then (e.g., upon failing to pair or disruption of communication) initiate pairing over another alternative carrier identified in the Select message.

Figure 7:
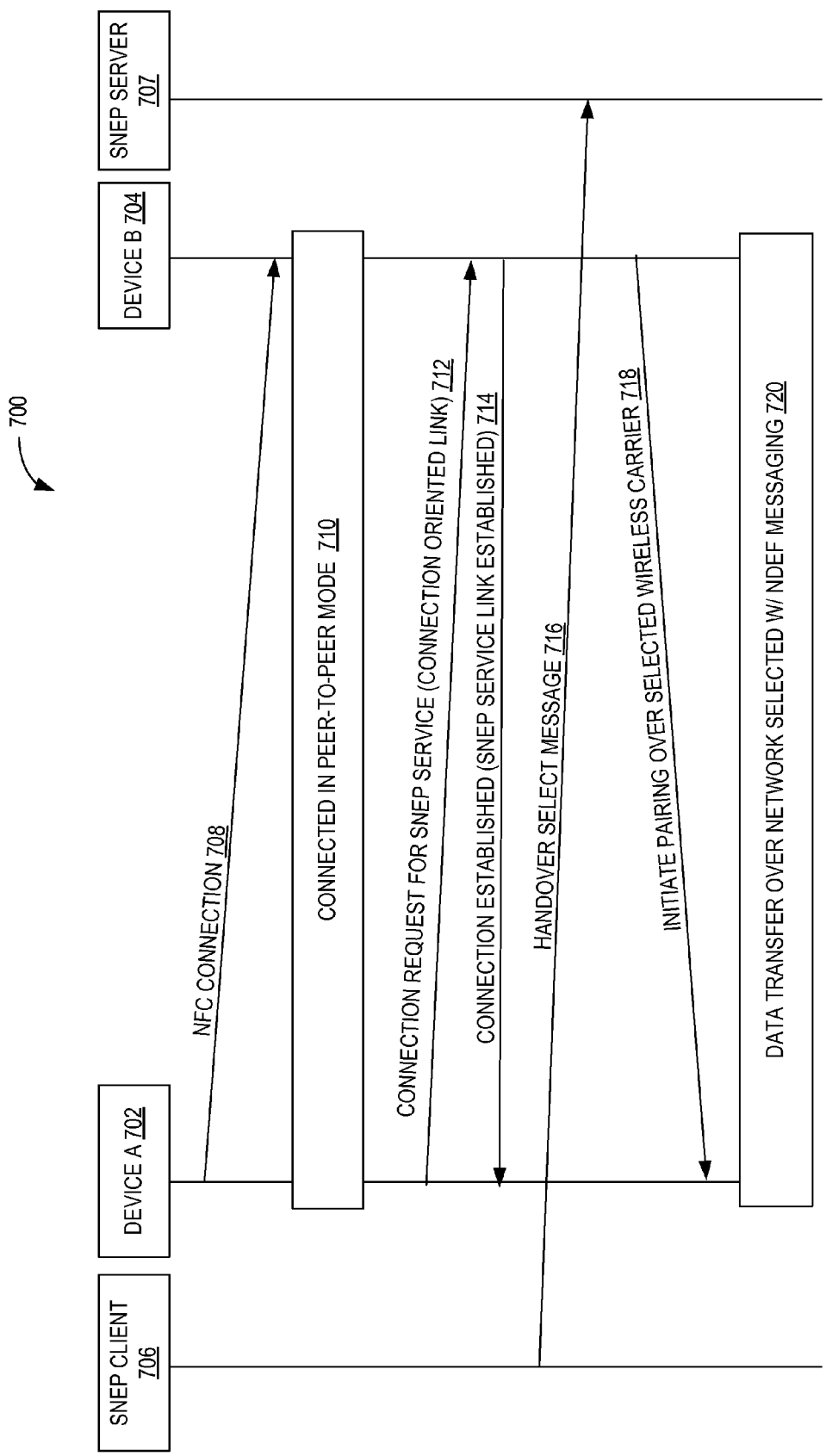
FIG. 7 shows an example communication diagram for expedited handover in accordance with one or more embodiments of the present disclosure.

The preceding examples of static and negotiated handover may be optimized for devices that have strong enough antennas to read an NFC tag (e.g., in the static handover example) and/or are fully NFC certified/compatible with other NFC devices (e.g., according to the NFC protocols described above). However, some devices may not have strong enough RF antennas to read out emulated NFC tags reliably. Some devices may additionally or alternatively not be certified for negotiated handover, may not be able to encode NDEF messages according to NFC standards, and/or may not be able to connect to an NFC handover server (e.g., handover servers 408 and 608 of FIGS. 4 and 6, respectively). However, many devices that have the issues indicated above are configured to communicate with a Simple NDEF Exchange Protocol (SNEP) server (e.g., due to the inclusion of SNEP service capabilities in the NFC Forum certification requirements). SNEP allows an application on an NFC-enabled device to exchange NDEF messages with another NFC-enabled device when operating in peer-to-peer mode. The protocol makes use of the Logical Link Control Protocol (LLCP) connection-oriented transport mode to provide a reliable data exchange. A device may send an NDEF message within a field of a SNEP message to a SNEP Service implemented on another active device. FIG. 7 shows a communication diagram 700 for negotiating alternative wireless communications between device A 702 and device B 704 using a SNEP service (e.g., via SNEP client 706 and SNEP server 707 in an expedited handover routine. Devices A and B may correspond to any of the active devices described in FIGS. 3 and 5. At 708, devices A and B may initiate an NFC connection, enabling the devices to be connected in NFC peer-to-peer mode at 710. At 712, device A sends a connection request for SNEP service via a connection oriented link, which is established at 714.

At 716, the SNEP client 706 sends a Handover Select NDEF message. For example, the Handover Select NDEF message may identify alternative wireless carriers as described above. The Select message may be transmitted from device A to device B via SNEP client 706. For example, the Select message may be transmitted from device A and/or SNEP client 706 to the SNEP server 707 of the device B, allowing the Select message to be received and read by Device B at 714. A record of the Select message may be stored at device A and/or device B logging the Select message as being sent to/from the SNEP client 706/SNEP server 707. For example, a log entry may indicate an address of the SNEP client 706 and/or SNEP server 707 as the recipient or intermediate transmitter, respectively, as well as a time at which the Select message was sent/received.

At 718, device B initiates pairing over the selected wireless carrier, which is selected from the alternative wireless carriers identified in the Handover Select NDEF message sent at 716. For example, the initiation of communication over the selected wireless carrier may include sending a confirmation message over the selected wireless carrier. Device B may select an alternative carrier (e.g., a subset of the selected alternative carriers in the Select message and/or the selected alternative carrier in the Select message) as described above regarding the active device's selection of alternative carrier(s) from the Select message in FIG. 4. At 720, data transfer (e.g., two-way communication) over the selected network (e.g., the network over which the devices are paired at 718) is performed. In this way, only one device sends an NDEF message, as provided for in the static handover of FIG. 4, but neither device is responsible for reading an NFC tag, as provided for in the negotiated handover of FIG. 6.

Figure 8:
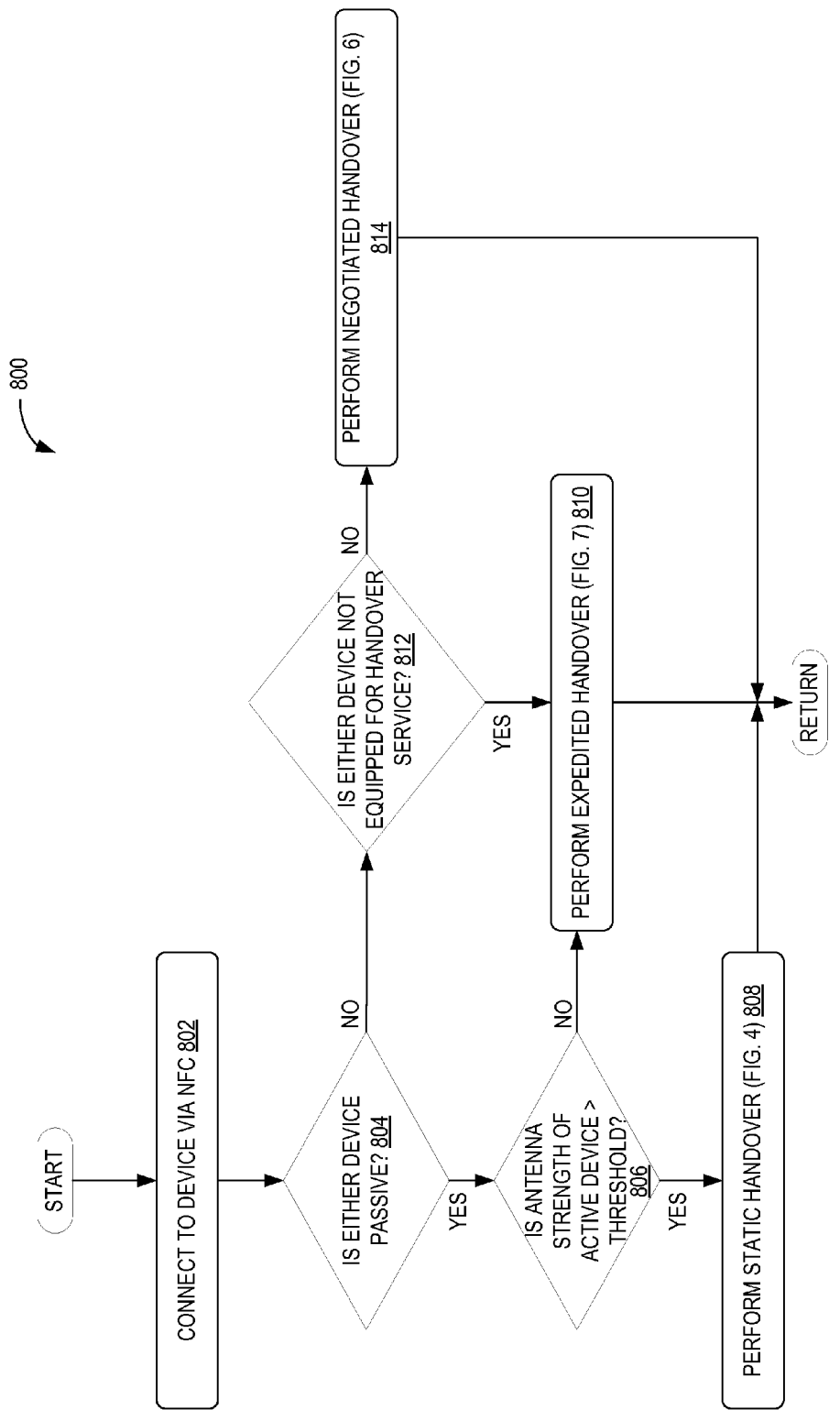
FIG. 8 is a flow chart of an example method of selectively performing different types of handover in accordance with one or more embodiments of the present disclosure.

FIG. 8 is a flow chart of a method 800 of selectively performing different types of handover in NFC-connected devices. For example, method 800 may be performed by any of the devices described above, including in-vehicle computing system 200, active devices 302, 502, and 504, device A 702, and/or device B 704, described with reference to FIGS. 2, 3, 5, and 7. At 802, method 800 includes connecting to a device via NFC. At 804, the method includes determining whether either device (e.g., either the device that connected to the device at 802 or the device performing method 800) is passive. It is to be understood that determining whether either device is passive may include determining if the device is an NFC tag or if the device is emulating an NFC tag (e.g., an active device emulating an NFC tag). If one of the devices is passive (e.g., "YES" at 804), the method proceeds to 806 to determine whether the antenna strength of the active device is greater than a threshold. For example, the threshold may be set to a value that indicates the ability of the active device to read an NFC tag from a specified distance (or at all). A maximum range of the NFC tag may be used to determine the specified distance. For example, the specified distance may be equal to or a predetermined amount less than the maximum range of the NFC tag, such that the threshold represents an ability of the antenna to connect to the NFC tag at its maximum range or at some distance within the range of the NFC tag.

If the antenna strength of the active device is above the threshold (e.g., "YES" at 806), the method proceeds to 808 to perform a static handover technique. For example, the static handover technique illustrated in FIG. 4 may be performed at 808 to transfer communication between the devices from NFC to a selected alternative wireless carrier. Conversely, if the antenna strength of the active device is not greater than the threshold (e.g., "NO" at 806), the method proceeds to 810 to perform an expedited handover. For example, the expedited handover technique illustrated in FIG. 7 may be performed at 810 to transfer communication between the devices from NFC to a selected alternative wireless carrier without the active device reading an NFC tag.

Returning to 804, if neither device is passive (e.g., "NO" at 804), the method proceeds to 812 to determine whether either device is not equipped to implement the Handover service (e.g., equipped to connect to the Handover service/ server). In one example, a device that is not NFC-certified may not be equipped to implement the Handover service. For example, as described above, some devices may be able to communicate via NFC, but may not be fully certified and/or able to connect to NFC handover servers. The devices may be checked for Handover service compatibility by attempting to connect to the device to the Handover service, and determining whether the connection is successful. If either device is not equipped to implement the Handover service (e.g., "YES" at 812), the method proceeds to 810 to perform the expedited handover. As shown in FIG. 7, the expedited handover technique utilizes a SNEP server, which is compatible with all NFC-enabled devices. Furthermore, only one device sends NDEF messages (e.g., a device that is NFC-certified), enabling devices that are not able to connect to the Handover service (e.g., non-certified NFC devices) to still participate in negotiation of alternative network communications. If each device is NFC-certified (e.g., "NO" at 812), the method proceeds to 814 to perform a negotiated handover. For example, the negotiated handover technique illustrated in FIG. 6 may be performed at 814 to transfer communication between the devices from NFC to a selected alternative wireless carrier via Handover Request and Handover Select NDEF messages sent to one another via a handover server (e.g., handover server 608 of FIG. 6). By selectively performing different types of handover, wireless communication may be transferred to different carriers by a technique that is tailored to the capabilities of the devices performing the handover.

The description of embodiments has been presented for purposes of illustration and description. Suitable modifications and variations to the embodiments may be performed in light of the above description or may be acquired from practicing the methods. For example, unless otherwise noted, one or more of the described methods may be performed by a suitable device and/or combination of devices, such as the in-vehicle computing system 109 or 200, active devices 302, 502, 504, passive device 304, device A 702, and/or device B 704 described with reference to FIGS. 1-3, 5, and 7. The methods may be performed by executing stored instructions with one or more logic devices (e.g., processors) in combination with one or more additional hardware elements, such as storage devices, memory, hardware network interfaces/antennas, switches, actuators, clock circuits, etc. The described methods and associated actions may also be performed in various orders in addition to the order described in this application, in parallel, and/or simultaneously. The described systems are exemplary in nature, and may include additional elements and/or omit elements. The subject matter of the present disclosure includes all novel and non-obvious combinations and sub-combinations of the various systems and configurations, and other features, functions, and/or properties disclosed.

As used in this application, an element or step recited in the singular and proceeded with the word "a" or "an" should be understood as not excluding plural of said elements or steps, unless such exclusion is stated. Furthermore, references to "one embodiment" or "one example" of the present disclosure are not intended to be interpreted as excluding the existence of additional embodiments that also incorporate the recited features. The terms "first," "second," and "third," etc. are used merely as labels, and are not intended to impose numerical requirements or a particular positional order on their objects. The following claims particularly point out subject matter from the above disclosure that is regarded as novel and non-obvious.

The invention claimed is:

1. An in-vehicle computing system of a vehicle, the in-vehicle computing system comprising:
   a first network interface configured to communicate over a first wireless carrier;
   a second network interface configured to communicate over a second wireless carrier;
   a processor; and
   a storage device storing instructions executable by the processor to:
   connect to a computing device over the first wireless carrier;
   send a select message over the first wireless carrier to the computing device via a remote server, the select message identifying the second wireless carrier;
   receive a confirmation message from the computing device initiating communication over the second wireless carrier; and
   receive data from the computing device over the second wireless carrier.

2. The in-vehicle computing system of claim 1, wherein the first wireless carrier is a Near Field Communication (NFC) carrier, the select message is a NFC Data Exchange Format (NDEF) Handover Select message, and the remote server is a Simple NDEF Exchange Protocol (SNEP) server.

3. The in-vehicle computing system of claim 2, wherein the second wireless carrier is a BLUETOOTH carrier.

4. The in-vehicle computing system of claim 2, wherein the second wireless carrier is a WI-FI carrier.

5. The in-vehicle computing system of claim 2, wherein the computing device is a mobile device located in the vehicle.

6. The in-vehicle computing system of claim 2, wherein the instructions are further executable to initiate communication over the second wireless carrier without sending a Handover Request NDEF message between the in-vehicle computing system and the computing device.

7. The in-vehicle computing system of claim 2, wherein the instructions are further executable by the processor to log an identifier of the SNEP server responsive to sending the select message.

8. The in-vehicle computing system of claim 2, wherein the select message only identifies the second wireless carrier.

9. The in-vehicle computing system of claim 8, wherein the select message includes a BLUETOOTH address for identifying the second wireless carrier.

10. At a first device, a method of performing handover between the first device and a second device from a first wireless carrier to a second wireless carrier, the method comprising:
    establishing communication with the second device over the first wireless carrier;
    determining an antenna strength of a radio antenna of the second device;
    responsive to determining that the antenna strength is above a threshold, reading an emulated tag including an indication of the second wireless carrier identifying the second wireless carrier;

responsive to determining that the antenna strength is below the threshold, sending a select message to a SNEP server identifying the second wireless carrier;

receiving a confirmation message from the second device initiating communication over the second wireless carrier; and receiving data from the second device over the second wireless carrier.

11. The method of claim 10, wherein the first wireless carrier is an NFC carrier, the emulated tag is an emulated NFC tag, and the select message is a Handover Select NDEF message.

12. The method of claim 11, wherein the second wireless carrier is a BLUETOOTH carrier.

13. The method of claim 11, wherein the second wireless carrier is a WI-FI carrier.

14. The method of claim 11, further comprising initiating communication over the second wireless carrier without sending a Handover Request NDEF message between the first device and the second device.

15. The method of claim 11, further comprising logging an identifier of a handover server responsive to sending the select message and logging an identifier of the SNEP server responsive to sending a second select message, the handover server being an NFC handover server.

16. An in-vehicle computing system of a vehicle, the in-vehicle computing system comprising:
an NFC interface configured to communicate over an NFC carrier;
a second network interface configured to communicate over a second wireless carrier, different from the NFC carrier;
a processor; and
a storage device storing instructions executable by the processor to:
connect to a mobile computing device over NFC;
selectively perform an expedited handover based on device capabilities of the mobile computing device, wherein the expedited handover includes sending a Handover Select NDEF message over NFC to the mobile computing device via a SNEP server, the Handover Select NDEF message identifying the second wireless carrier, and logging an identifier of the SNEP server responsive to sending the Handover Select NDEF message;
receive a confirmation message from the mobile computing device initiating communication over the second wireless carrier; and
receive data from the mobile computing device over the second wireless carrier.

17. The in-vehicle computing system of claim 16, wherein the instructions are further executable by the processor to perform a negotiated handover responsive to determining that each of the in-vehicle computing system and the mobile computing device is an active NFC device that is equipped to connect to a Handover service, the negotiated handover comprising:
sending a Handover Request NDEF message from the in-vehicle computing system to the mobile computing device via an NFC handover server while the in-vehicle computing system is connected to the mobile computing device in a peer-to-peer NFC mode, the Handover Request NDEF message indicating one or more requested wireless carriers;
logging an identifier of the NFC handover server responsive to sending the Handover Request NDEF message; and
receiving a Handover Select NDEF message from the mobile computing device, the Handover Select NDEF message indicating one or more selected wireless carriers, the one or more selected wireless carriers being selected from the one or more requested wireless carriers.

18. The in-vehicle computing system of claim 16, wherein the instructions are executable to send only a Handover Select NDEF message without sending or receiving a Handover Request NDEF message when selectively performing the expedited handover.

19. The in-vehicle computing system of claim 16, wherein the instructions are further executable by the processor to:
perform a static handover responsive to determining that one of the in-vehicle computing system and the mobile computing device is a passive NFC device, one of the in-vehicle computing system and the mobile computing device is an active NFC device, and a strength of an antenna of the active NFC device is above a threshold, the static handover including indicating the second wireless carrier in an NFC tag; and
perform the expedited handover responsive to determining that one of the in-vehicle computing system and the mobile computing device is a passive NFC device, one of the in-vehicle computing system and the mobile computing device is an active NFC device, and a strength of an antenna of the active NFC device is below the threshold.

20. The in-vehicle computing system of claim 16, wherein the second carrier is one of a BLUETOOTH carrier and a WI-FI carrier.

* * * * *